(12) United States Patent
Takai

(10) Patent No.: US 10,938,326 B2
(45) Date of Patent: Mar. 2, 2021

(54) VIBRATION WAVE MOTOR AND OPTICAL APPARATUS USING VIBRATION WAVE MOTOR

(71) Applicant: CANON KABUSHIKI KAISHA, Tokyo (JP)

(72) Inventor: Kenta Takai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 539 days.

(21) Appl. No.: 15/908,889

(22) Filed: Mar. 1, 2018

(65) Prior Publication Data

US 2018/0254718 A1    Sep. 6, 2018

(30) Foreign Application Priority Data

Mar. 2, 2017    (JP) .............................. JP2017-039054

(51) Int. Cl.
*H02N 2/04*    (2006.01)
*H02N 2/02*    (2006.01)
(Continued)

(52) U.S. Cl.
CPC ............ *H02N 2/046* (2013.01); *B06B 1/0644* (2013.01); *G02B 7/04* (2013.01); *G02B 7/08* (2013.01);
(Continued)

(58) Field of Classification Search
CPC .......... H02N 2/046; H02N 2/026; G02N 7/04; G03B 13/34; B06B 1/0644
See application file for complete search history.

(56) References Cited

U.S. PATENT DOCUMENTS

2009/0015099 A1\*    1/2009    Mukae .................... H02N 2/103
310/323.01
2011/0031847 A1\*    2/2011    Sakamoto ................ H02N 2/04
310/323.02
(Continued)

FOREIGN PATENT DOCUMENTS

| JP | 02-22094 U | 2/1990 |
| JP | 2006-33995 A | 2/2006 |
| JP | 2015-065809 A | 4/2015 |

OTHER PUBLICATIONS

The above foreign patent documents were cited in the Nov. 10, 2020 Japanese Office Action, a copy of which is unclosed without an English Translation, that issued in Japanese Patent Application No. 2017-039054.

*Primary Examiner* — Bryan P Gordon
(74) *Attorney, Agent, or Firm* — Cowan, Liebowitz & Latman, P.C.

(57) ABSTRACT

Disclosed is a vibration wave motor including: a vibrator provided with a piezoelectric element and a vibration plate; a frictional member having a frictional contact surface coming into contact with the vibrator; a fixing member having a recess to which the frictional member is fixed; and pressurizing unit that pressurizes the vibrator toward the frictional member, wherein the vibrator and the frictional member make relative movement using vibration generated from the vibrator, a fixing material for fixing the frictional member is provided between the frictional member and the fixing member, and the frictional member is fixed by coming into contact with the fixing member.

13 Claims, 4 Drawing Sheets

(51) Int. Cl.
*G02B 7/04* (2021.01)
*G03B 13/34* (2021.01)
*B06B 1/06* (2006.01)
*H02N 2/00* (2006.01)
*G02B 7/08* (2021.01)
*G03B 3/10* (2021.01)

(52) U.S. Cl.
CPC ............. *G03B 13/34* (2013.01); *H02N 2/001* (2013.01); *H02N 2/006* (2013.01); *H02N 2/0065* (2013.01); *H02N 2/026* (2013.01); *G03B 3/10* (2013.01); *G03B 2205/0061* (2013.01)

(56) References Cited

U.S. PATENT DOCUMENTS

| | | | | |
|---|---|---|---|---|
| 2011/0037348 A1* | 2/2011 | Sakamoto | ............... | F16C 29/04 |
| | | | | 310/323.02 |
| 2014/0293463 A1* | 10/2014 | Yamanaka | ............. | H02N 2/004 |
| | | | | 359/824 |
| 2015/0200611 A1* | 7/2015 | Yamamoto | ............. | H02N 2/026 |
| | | | | 310/323.03 |
| 2016/0111979 A1* | 4/2016 | Yamanaka | ............... | H02N 2/12 |
| | | | | 359/814 |

* cited by examiner

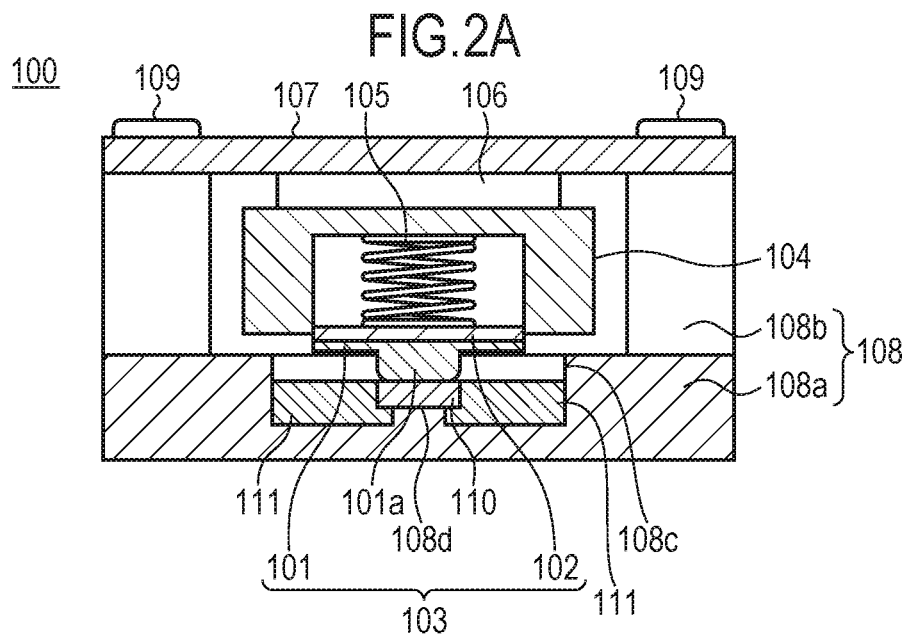
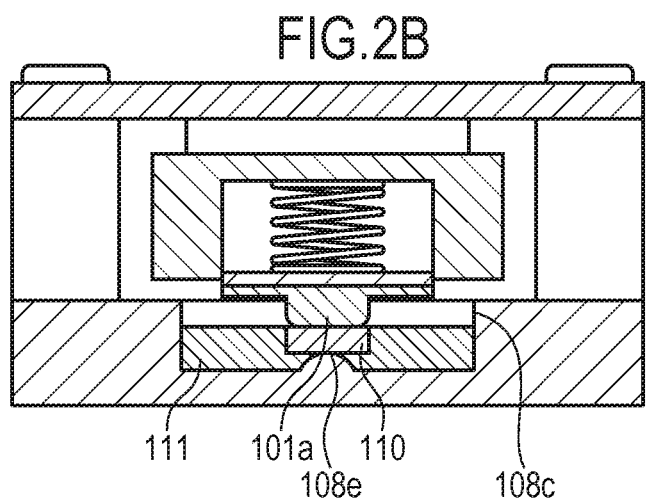
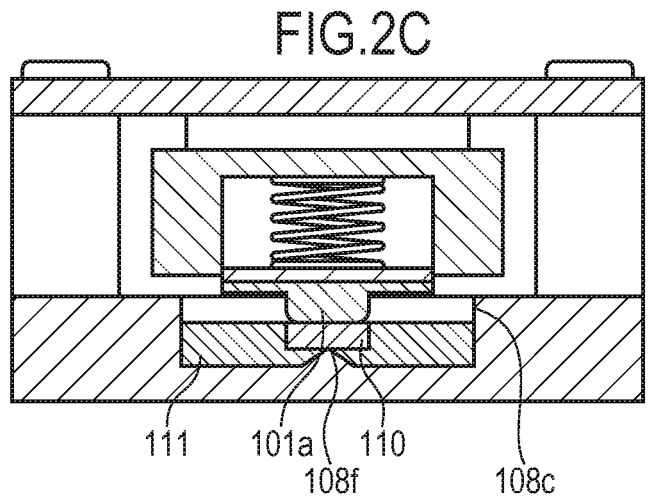

VIBRATION WAVE MOTOR AND OPTICAL APPARATUS USING VIBRATION WAVE MOTOR

BACKGROUND OF THE INVENTION

Field of the Invention

The present invention relates to a vibration wave motor, and more particularly, to miniaturization of a linear translation type vibration wave motor.

Description of the Related Art

A linear translation type ultrasonic motor has excellent driving efficiency and high driving output power, and can be miniaturized while maintaining high driving output power. For example, a linear translation type ultrasonic motor disclosed in Japanese Patent Application Laid-Open No. 2015-65809 includes a movable portion having a vibrator provided with a piezoelectric element and a pressurizing portion that allows the vibrator to come into pressurized contact with the frictional member, and a fixing member that fixes the frictional member, and three rolling portions and guide portions extending in a movable direction of the movable portion.

SUMMARY OF THE INVENTION

However, in the linear translation type ultrasonic motor disclosed in Japanese Patent Application Laid-Open No. 2015-65809, when the movable portion is placed in a movable end which is a limitation of the movable range of the movable direction, the guide portion extending the movable direction is placed outward of the movable portion in the movable direction. For this reason, the fixing member that fixes the frictional member is placed outward of the movable range. For this configuration, a total length of the frictional member and the fixing member that fixes the frictional member in the movable direction increases disadvantageously.

An object of the present invention is to provide a compact vibration wave motor.

In order to achieve the aforementioned object, according to the present invention, there is provided a vibration wave motor including: a vibrator that includes a piezoelectric element and a vibration plate; a frictional member having a frictional contact surface in contact with the vibrator; a fixing member having a recess to which the frictional member is fixed; and pressurizing unit that pressurizes the vibrator against the frictional member, wherein the vibrator and the frictional member relatively move using vibration generated from the vibrator, a fixing material is provided between the frictional member and the fixing member to fix the frictional member, and the frictional member is fixed by contacting the fixing member.

According to the present invention, it is possible to obtain a compact vibration wave motor.

Further features of the present invention will become apparent from the following description of exemplary embodiments with reference to the attached drawings.

BRIEF DESCRIPTION OF THE DRAWINGS

FIGS. 2A, 2B and 2C are cross-sectional views taken along a Y-direction of the vibration wave motor 100 according to the invention.

DESCRIPTION OF THE EMBODIMENTS

Preferred embodiments of the present invention will now be described in detail in accordance with the accompanying drawings.

In the following description, a linear translation type vibration wave motor unitized as an actuator for driving a lens barrel of a digital camera or the like (hereinafter, referred to as a "vibration wave motor 100") will be described by way of example. However, an application of the present invention is not limited thereto. In addition, herein, a drive direction along which a vibrator 103 described below is driven will be set to an X-direction, and a pressurizing direction for pressuring the vibrator 103 toward the frictional member 110 will be set to a Z-direction. In the Z-direction, a direction from the frictional member 110 to the vibrator 103 will be defined as a +Z-direction, and a direction opposite thereto will be defined as a −Z-direction. Furthermore, a direction perpendicular to the X-direction and the Z-direction will be set to a Y-direction.

Embodiments

Figure 1:
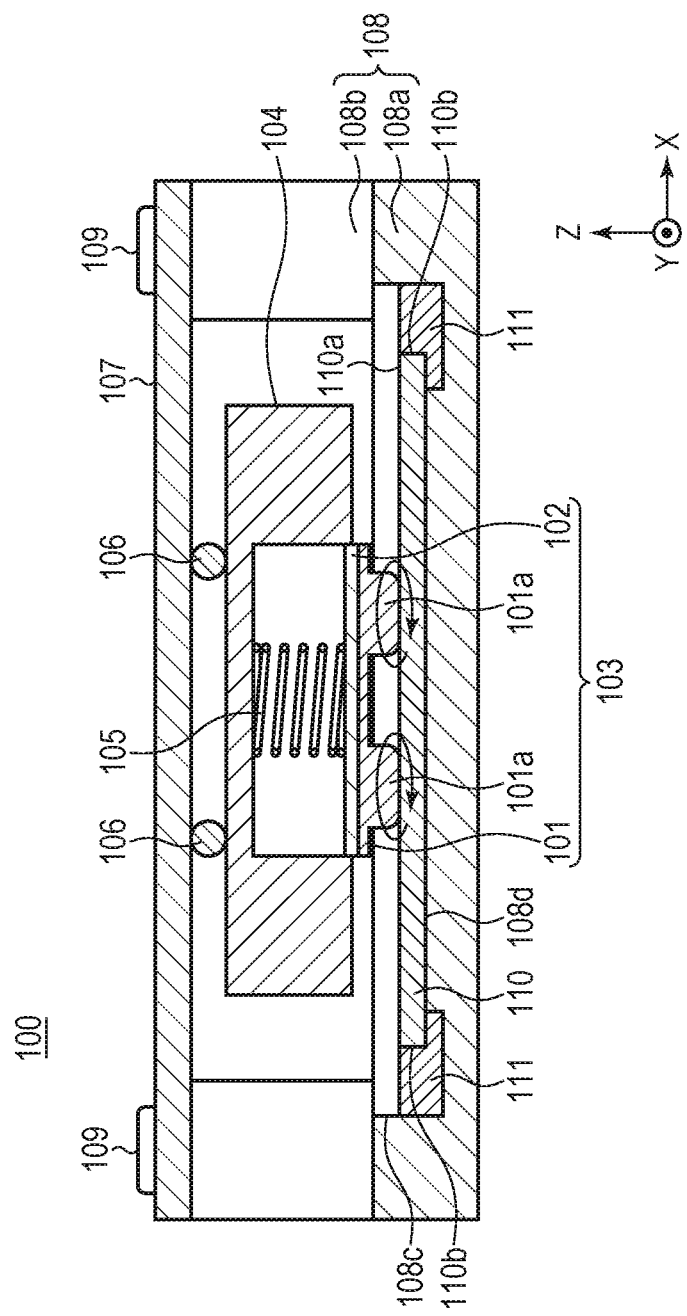
FIG. 1 is a cross-sectional view taken along an X-direction of a vibration wave motor 100 according to the invention.

FIG. 1 is a cross-sectional view illustrating a cross section taken along the X-direction of the vibration wave motor 100 according to an embodiment of the invention. FIG. 2A is a cross-sectional view illustrating a cross section taken along the Y-direction of the vibration wave motor 100. The vibration wave motor 100 according to this embodiment has a long axis in the drive direction and consists of each member described below.

The vibrator 103 has a vibration plate 101 and a piezoelectric element 102. The piezoelectric element 102 is fixed to the vibration plate 101 using an adhesive known in the art or the like. A method of bonding the vibration plate 101 and the piezoelectric element 102 is not particularly limited as long as they are bonded. The vibration plate 101 further has a frictional contact portion 101a, which comes into contact with the frictional member 110 in a pressurized contact state.

Vibration of an ultrasonic frequency range (ultrasonic vibration) is generated by applying a voltage to the piezoelectric element 102 while the vibration plate 101 and the piezoelectric element 102 are bonded to each other. This generates resonance in the vibrator 103. As a result, an elliptical motion is generated in the frictional contact portion 101a of the vibration plate 101. A rotation direction or an elliptical ratio of this elliptical motion can be changed as appropriate by changing a frequency or phase of the voltage applied to the piezoelectric element 102. This makes it possible to obtain a desired motion.

The vibrator support member 104 internally has a spring 105 (pressurizing unit) for generating a pressurizing force. The vibrator 103 is pressurized to the frictional member 110 in the Z-direction by virtue of the pressurizing force of the spring 105. In addition, the vibrator support member 104 restricts a movement in a direction other than the Z-direction which is the pressurizing direction of the vibrator 103 and holds the vibrator 103 in the X-direction and the Y-direction.

The vibrator support member 104 is held by a holding member 107 by interposing a rolling member 106 movably in the X-direction. The rolling member 106 is interposed between an upper surface of the vibrator support member 104 of the Z-direction and a lower surface of the holding member 107 of the Z-direction, and receives a drive force of the vibrator 103 and a biasing force from the vibrator support member 104 caused by the pressurizing force of the spring 105. Note that the rolling member 106 has, for example, a roller shape and rolls to allow the vibrator support member 104 to move in the X-direction. The holding member 107 is fixed to the fixing member 108 described below using a screw 109 or the like. However, a fixing method is not particularly limited as long as the holding member 107 can be fixed.

The fixing member 108 includes a base portion 108a and four pillar portions 108b extending from the base portion 108a in the Z-direction. The holding member 107 is fixed to the top portions of the four pillar portions 108b using screws 109. A recess 108c is formed in the base portion 108a, and the frictional member 110 is placed in the recess 108c. The recess 108c has a shape recessed in a center of the fixing member 108 as seen in a cross-sectional view along the Y-direction and as seen in the cross-sectional view along the X-direction. In addition, the recess 108c of the fixing member 108 has a support surface 108d coming into contact with a surface opposite to the frictional contact surface 110a of the frictional member 110 and lying in parallel with a relative movement direction to support the frictional member 110 on the support surface 108d against the pressurizing force of the spring 105.

The support surface 108d is bulged in the Z-direction and has a rectangular cross-sectional shape as seen in the Y-direction. A projection area of the support surface 108d in the Z-direction is smaller than the projection area of the frictional member 110. That is, in the cross section along the X-direction in FIG. 1, the length of the support surface 108d in the X-direction is shorter than the length of the frictional member 110. In the cross section along the Y-direction in FIG. 2A, the length of the support surface 108d in the Y-direction is shorter than the length of the frictional member 110. In addition, a slider fixing material 111 is provided in a space of the recess 108c between the frictional member 110 and the fixing member 108, so that the frictional member 110 is fixed to the fixing member 108 using the slider fixing material 111. In particular, an enclosed space other than the support surface 108d (the region excluding the support surface 108d) where the frictional member 110 comes into contact with the fixing member 108 is filled with the slider fixing material 111 without a gap. In addition, the slider fixing material 111 is placed in a position not overlapping with the vibrator 103 in the drive direction of the vibrator 103.

The slider fixing material 111 is formed of an elastic body so as to absorb vibration propagating from the frictional contact portion 101a to the frictional member 110 and suppress resonance. As a result, it prevents noise generated from the frictional contact portion 101a of the vibration plate 101 during operation. In addition, the slider fixing material 111 has viscosity so as to absorb wear debris generated by contact between the frictional member 110 and the frictional contact portion 101a of the vibration plate 101 and prevent scattering of the wear debris. Alternatively, the slider fixing material 111 may be a gel-type material. The aforementioned members are assembled and unitized into a vibration wave motor 100.

FIG. 2B is a cross-sectional view illustrating a first modification of the invention. In the first modification, the recess 108c is provided with a support portion 108e having a substantially semi-cylindrical cross-sectional shape. In addition, FIG. 2C is a cross-sectional views illustrating a second modification of the invention. In the second modification, the recess 108c is provided with a support portion 108f having a substantially triangular cross-sectional shape. In the first and second modifications, the frictional member 110 is supported such that tilting of the frictional member 110 is allowed in the Y-direction.

Figures 3A, 3B:
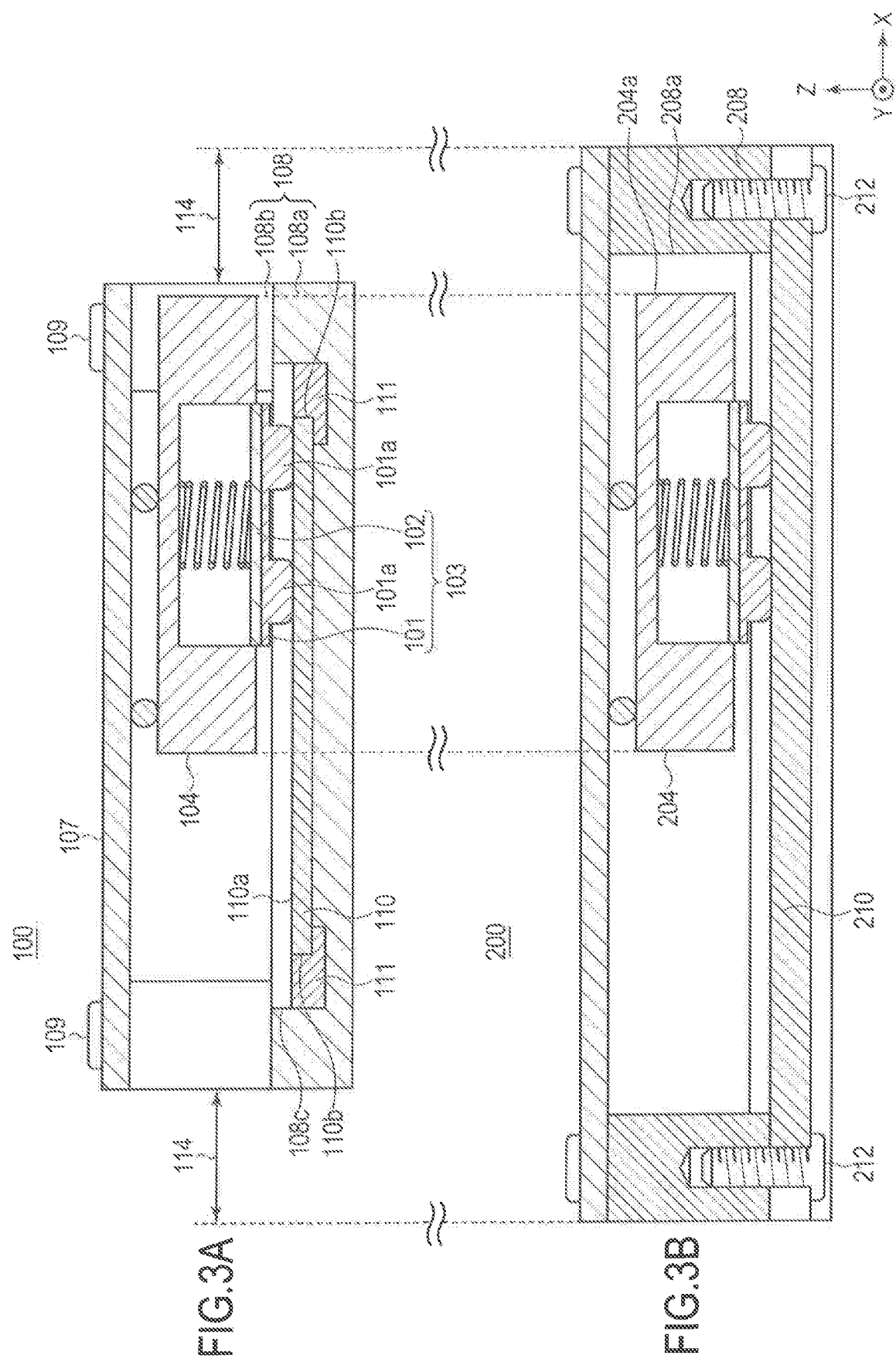
FIG. 3A is a cross-sectional view taken along the X-direction of the vibration wave motor 100 according to the invention.
FIG. 3B is a cross-sectional view illustrating a linear translation type ultrasonic motor 200 of the prior art.

Next, the X-directional sizes of the vibration wave motor 100 according to the present invention and the linear translation type ultrasonic motor 200 of the prior art will be described with reference to FIGS. 3A and 3B. FIG. 3A is a cross-sectional view illustrating the vibration wave motor 100 same as FIG. 1, in which the movable portion including the vibrator support member 104 is placed in a movable end which is a limitation of the movable range of the X-direction. The vibrator support member 104 and the fixing member 108 are provided with abutting portions (not shown) for restricting movement of the movable portion in the movable end. Although the frictional contact portion 101a of the vibration plate 101 is placed inward of an end portion 110b of the drive direction of the frictional member 110, an end of the drive direction of the vibrator 103 and the vibrator support member 104 extend outward of the end portion 110b of the drive direction of the frictional member 110. That is, the end of the drive direction of the vibrator 103 can move to a position aligned with the slider fixing material 111 in the Y-direction. In addition, a sidewall portion that forms the recess 108c of the fixing member 108 and the vicinity of the frictional contact portion 101a of the vibration plate 101 are isolated from each other.

FIG. 3B is a cross-sectional view illustrating a linear translation type ultrasonic motor 200 of the prior art, in which the movable portion including the vibrator support member 204 is placed in the movable end which is a limitation of the movable range of the X-direction. As the abutting portion 204a of the vibrator support member 204 and the abutting portion 208a of the fixing member 208 abut on each other, movement of the movable portion including the vibrator support member 204 is restricted. Since the frictional member 210 is fixed to the fixing member 208 using a frictional member fixing screw 212, it is necessarily placed outward of the abutting portion 208a in the X-direction.

Although the vibration wave motor 100 according to the present invention has the same drive amount as that of the linear translation type ultrasonic motor 200 of the prior art, the frictional member 210 of the linear translation type ultrasonic motor 200 of the prior art is placed outward in the X-direction, so that a size of the entire unit increases. In comparison, in the vibration wave motor 100 according to the present invention, since the frictional member 110 is placed inward in the X-direction, a dimension indicated by the arrow 114 can be reduced. Similarly, it is also possible to reduce the dimension indicated by the arrow 114 in the −X-direction.

Figure 4:
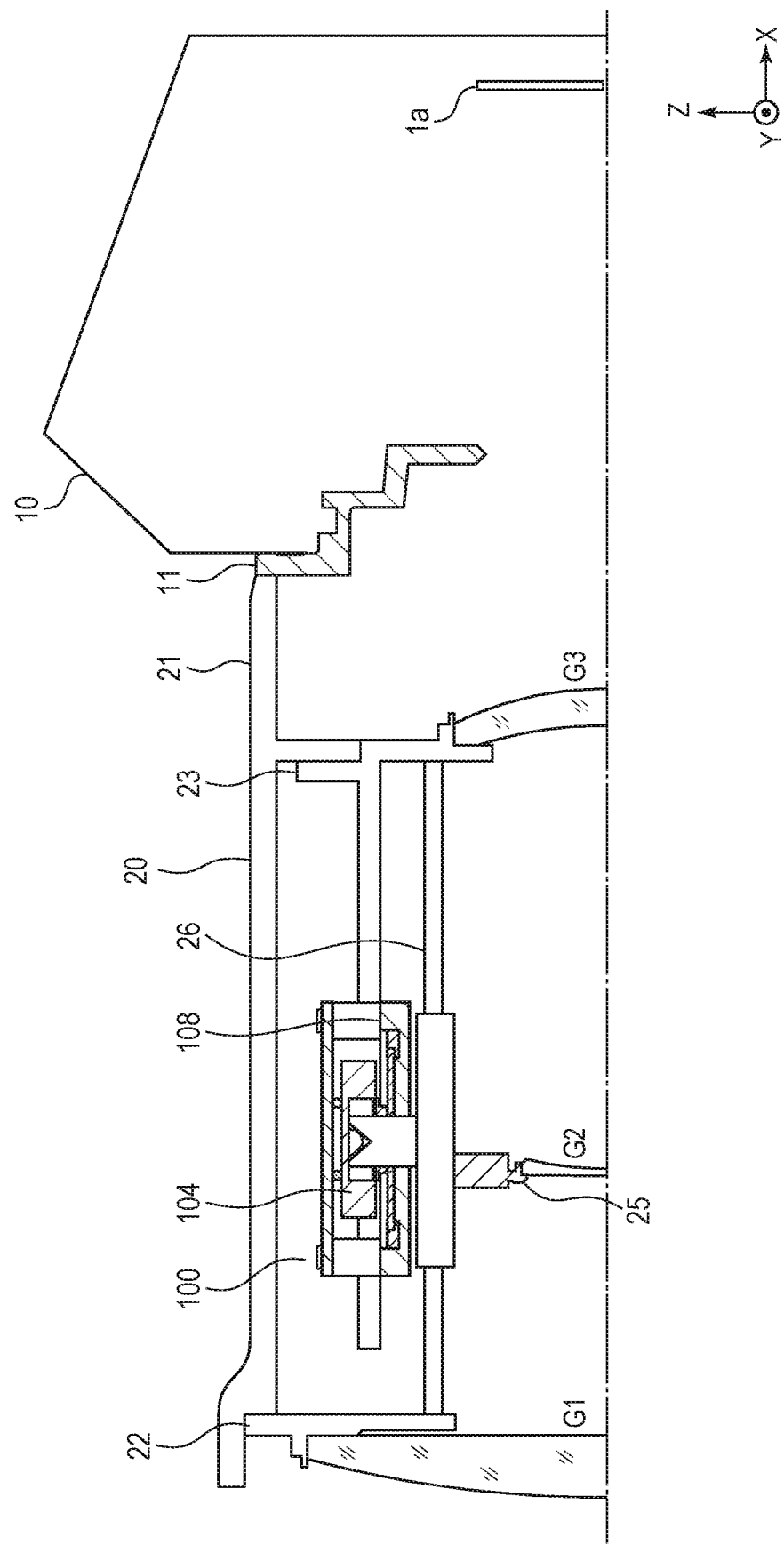
FIG. 4 is a cross-sectional view illustrating a lens barrel 20 mounted with the vibration wave motor 100 according to the invention.

FIG. 4 illustrates a lens barrel 20 as an exemplary lens unit integrated with the vibration wave motor 100 according to the present invention. Note that, since this lens barrel 20 is substantially rotationally symmetric, only an upper part is illustrated.

A camera body 10 as an image sensing device is detachably installed with the lens barrel 20, and is internally provided with an image sensor 1a. A mount 11 of the camera body 10 is provided with a bayonet portion for installing the lens barrel 20 in the camera body 10. The lens barrel 20 has a fixed barrel 21, which abuts on a flange portion of the mount 11. In addition, the fixed barrel 21 and the mount 11 are fixed to each other using a screw (not shown). A front barrel 22 for holding a lens G1 and a rear barrel 23 for holding a lens G3 are further fixed to the fixed barrel 21. The lens barrel 20 is further provided with a focus lens holding frame 25 for holding a focus lens G2. The focus lens holding frame 25 is held to be rectilinearly movable by a guide bar 26 held by the front and rear barrels 22 and 23. The fixing member 108 of the vibration wave motor 100 is provided with a flange portion (not shown) and is fixed to the rear barrel 23 using a screw or the like.

In the aforementioned configuration, as the movable portion including the vibrator support member 104 of the vibration wave motor 100 is driven, the drive force of the vibration wave motor 100 is transmitted to the focus lens holding frame 25 via the vibrator support member 104. The focus lens holding frame 25 is guided by the guide bar 26 and moves rectilinearly.

In the aforementioned configuration, using the vibration wave motor 100, it is possible to obtain a compact vibration wave motor 100 in which it is not necessary to increase a length of the entire unit in the drive direction of the driven member. The invention is not limited to the embodiments described above, and may be embodied in any form within the scope of the attached claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-039054, filed Mar. 2, 2017, which is hereby incorporated by reference herein in its entirety.

What is claimed is:

1. A vibration wave motor comprising:
a vibrator that includes a piezoelectric element and a vibration plate;
a frictional member having a frictional contact surface in contact with the vibrator;
a fixing member having a recess to which the frictional member is fixed; and
pressurizing unit that pressurizes the vibrator against the frictional member,
wherein the vibrator and the frictional member relatively move using vibration generated from the vibrator,
a fixing material is provided between the frictional member and the fixing member to fix the frictional member, and
the frictional member is fixed by contacting the fixing member.

2. The vibration wave motor according to claim 1, wherein the fixing member has a support surface in contact with the frictional member, and
the support surface is in contact with a surface opposite to the frictional contact surface in parallel with a direction of the relative movement and supports the frictional member against a pressurizing force from the pressurizing unit.

3. The vibration wave motor according to claim 2, wherein the fixing material is filled in a region excluding the support surface without a gap in the recess.

4. The vibration wave motor according to claim 1, wherein the fixing material has viscosity to absorb wear debris generated due to the relative movement between the vibrator and the frictional member.

5. The vibration wave motor according to claim 1, wherein the fixing material is a gel-type material.

6. The vibration wave motor according to claim 1, wherein the fixing material is an elastic body.

7. The vibration wave motor according to claim 1, wherein the fixing material absorbs vibration received from the vibrator to the frictional member.

8. The vibration wave motor according to claim 1, wherein the vibration wave motor is an ultrasonic motor using vibration at an ultrasonic frequency range.

9. An optical apparatus using a vibration wave motor, comprising:
a vibrator that includes a piezoelectric element and a vibration plate;
a frictional member having a frictional contact surface in contact with the vibrator;
a fixing member having a recess to which the frictional member is fixed; and
pressurizing unit that pressurizes the vibrator against the frictional member,
wherein the vibrator and the frictional member relatively move using vibration generated from the vibrator,
a fixing material is provided between the frictional member and the fixing member to fix the frictional member, and
the frictional member is fixed by contacting the fixing member.

10. A vibration wave motor comprising:
a vibrator that includes a piezoelectric element and a vibration plate;
a frictional member having a frictional contact surface in contact with the vibrator;
a fixing member to which the frictional member is fixed; and
pressurizing unit that pressurizes the vibrator against the frictional member,
wherein the vibrator and the frictional member relatively move using vibration generated from the vibrator,
the frictional member and the fixing member are fixed by a fixing material, and
the fixing material is placed in a position not overlapping with the vibrator is a direction of the relative movement.

11. An optical apparatus using a vibration wave motor, comprising:
a vibrator that includes a piezoelectric element and a vibration plate;
a frictional member having a frictional contact surface in contact with the vibrator;
a fixing member to which the frictional member is fixed; and
pressurizing unit that pressurizes the vibrator against the frictional member,
wherein the vibrator and the frictional member relatively move using vibration generated from the vibrator,
the frictional member and the fixing member are fixed by a fixing material, and
the fixing material is placed in a position not overlapping with the vibrator in a direction of the relative movement.

12. A vibration wave motor comprising:
a vibrator that includes a piezoelectric element and a vibration plate;
a frictional member having a frictional contact surface in contact with the vibrator;
a fixing member to which the frictional member is fixed; and
pressurizing unit that pressurizes the vibrator against the frictional member,
wherein the vibrator and the frictional member relatively move using vibration generated from the vibrator,
the frictional member and the fixing member are fixed by a fixing material, and
an end of the vibrator in a direction of the relative movement is movable to a position aligned with the fixing material in a direction perpendicular to the direction of the relative movement.

13. An optical apparatus using a vibration wave motor, comprising:
a vibrator that includes a piezoelectric element and a vibration plate;
a frictional member having a frictional contact surface in contact with the vibrator;
a fixing member to which the frictional member is fixed; and
pressurizing unit that pressurizes the vibrator against the frictional member,
wherein the vibrator and the frictional member relatively move using vibration generated from the vibrator,
the frictional member and the fixing member are fixed by a fixing material, and
an end of the vibrator in a direction of the relative movement is movable to a position aligned with the fixing material in a direction perpendicular to the direction of the relative movement.

\* \* \* \* \*